US012600822B2

(12) United States Patent
Kwon et al.

(10) Patent No.: US 12,600,822 B2
(45) Date of Patent: Apr. 14, 2026

(54) METHOD FOR PREPARATION OF SUCCINYLATED COLLAGEN-FIBRINOGEN HYDROGEL

(71) Applicant: UNIVERSITY-INDUSTRY COOPERATION GROUP OF KYUNG HEE UNIVERSITY, Yongin-si (KR)

(72) Inventors: Il Keun Kwon, Seoul (KR); Jae Seo Lee, Seoul (KR); Ha Ram Nah, Goyang-si (KR); Dong Nyoung Heo, Seoul (KR); Ho Jin Moon, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 944 days.

(21) Appl. No.: 17/771,893

(22) PCT Filed: Aug. 19, 2020

(86) PCT No.: PCT/KR2020/011037
§ 371 (c)(1),
(2) Date: Apr. 26, 2022

(87) PCT Pub. No.: WO2021/085818
PCT Pub. Date: May 6, 2021

(65) Prior Publication Data
US 2022/0396671 A1      Dec. 15, 2022

(30) Foreign Application Priority Data

Oct. 31, 2019      (KR) ........................ 10-2019-0138136

(51) Int. Cl.
*C08H 1/00* (2006.01)
*C08J 3/075* (2006.01)

(52) U.S. Cl.
CPC ................ *C08H 1/00* (2013.01); *C08J 3/075* (2013.01)

(58) Field of Classification Search
None
See application file for complete search history.

(56) References Cited

U.S. PATENT DOCUMENTS 4,883,864 A * 11/1989 Scholz ................... C07K 14/78
128/DIG. 8
9,844,610 B2 * 12/2017 Park ........................ A61L 27/52

9,884,121 B2    2/2018  Utecht
2008/0119385 A1  5/2008  Michal
2015/0250890 A1  9/2015  Park

FOREIGN PATENT DOCUMENTS

| | | |
|---|---|---|
| JP | 2007-217699 A | 8/2007 |
| JP | 2010-510212 A | 4/2010 |
| KR | 10-0828494 B1 | 5/2008 |
| KR | 10-1522462 B1 | 5/2015 |
| KR | 10-2119693 B1 | 6/2020 |

OTHER PUBLICATIONS

Kumar, Ramadhar et. al, Physical characterization of succinylated type I collagen by Raman spectra and MALDI-TOF/MS and in vitro evaluation for biomedical applications, Journal of Molecular Structure, vol. 994, Issues 1-3, 2011, pp. 117-124, https://doi.org/10.1016/j.molstruc.2011.03.005. (Year: 2011).*

Jiang, Qiong et al., Hypromellose succinate-crosslinked chitosan hydrogel films for potential wound dressing, International Journal of Biological Macromolecules, vol. 91, 2016, pp. 85-91, https://doi.org/10.1016/j.ijbiomac.2016.05.077. (Year: 2016).*

Linsley CS, Wu BM, Tawil B. 2016. Mesenchymal stem cell growth on and mechanical properties offibrin-based biomimetic bone scaffolds. J Biomed Mater Res Part A 2016:104A:2945-2953. (Year: 2016).*

Skopinska-Wisniewska, Joanna, Dialysis as a method of obtaining neutral collagen gels, Materials Science and Engineering: C, vol. 40, 2014, pp. 65-70, https://doi.org/10.1016/j.msec.2014.03.029. (Year: 2014).*

Rowe et al. Interpenetrating Collagen-Fibrin Composite Matrices with Varying Protein Contents and Ratios, Biomacromolecules. Nov. 2006 ; 7(11): 2942-2948. (Year: 2006).*

Cummings et al. Properties of engineered vascular constructs made from collagen, fibrin, and collagen-fibrin mixtures, Biomaterials, 2004, 25, 3699-3706 (Year: 2004).*

International Search Report and Written Opinion issued in connection with corresponding PCT Application No. PCT/KR2020/011037 dated Dec. 11, 2020.

* cited by examiner

*Primary Examiner* — Sahana S Kaup
*Assistant Examiner* — Ashlee E Wertz
(74) *Attorney, Agent, or Firm* — Tarolli, Sundheim, Covell & Tummino LLP

(57) ABSTRACT

The present technique pertains to a method of preparation of a succinylated collagen-fibrinogen hydrogel and a succinylated collagen-fibrinogen hydrogel prepared thereby. The method of preparation of a succinylated collagen-fibrinogen hydrogel according to the present technique can produce a collagen-based bio-substance in a simple process, wherein collagen can be prevented from being entangled and an improvement can be brought about in hydrophilicity, cell growth rate, cell compatibility, and cell diffusion capability, whereby the collagen-based bio-substance exhibits excellent biocompatibility in vivo.

7 Claims, 10 Drawing Sheets

[Figure 1]
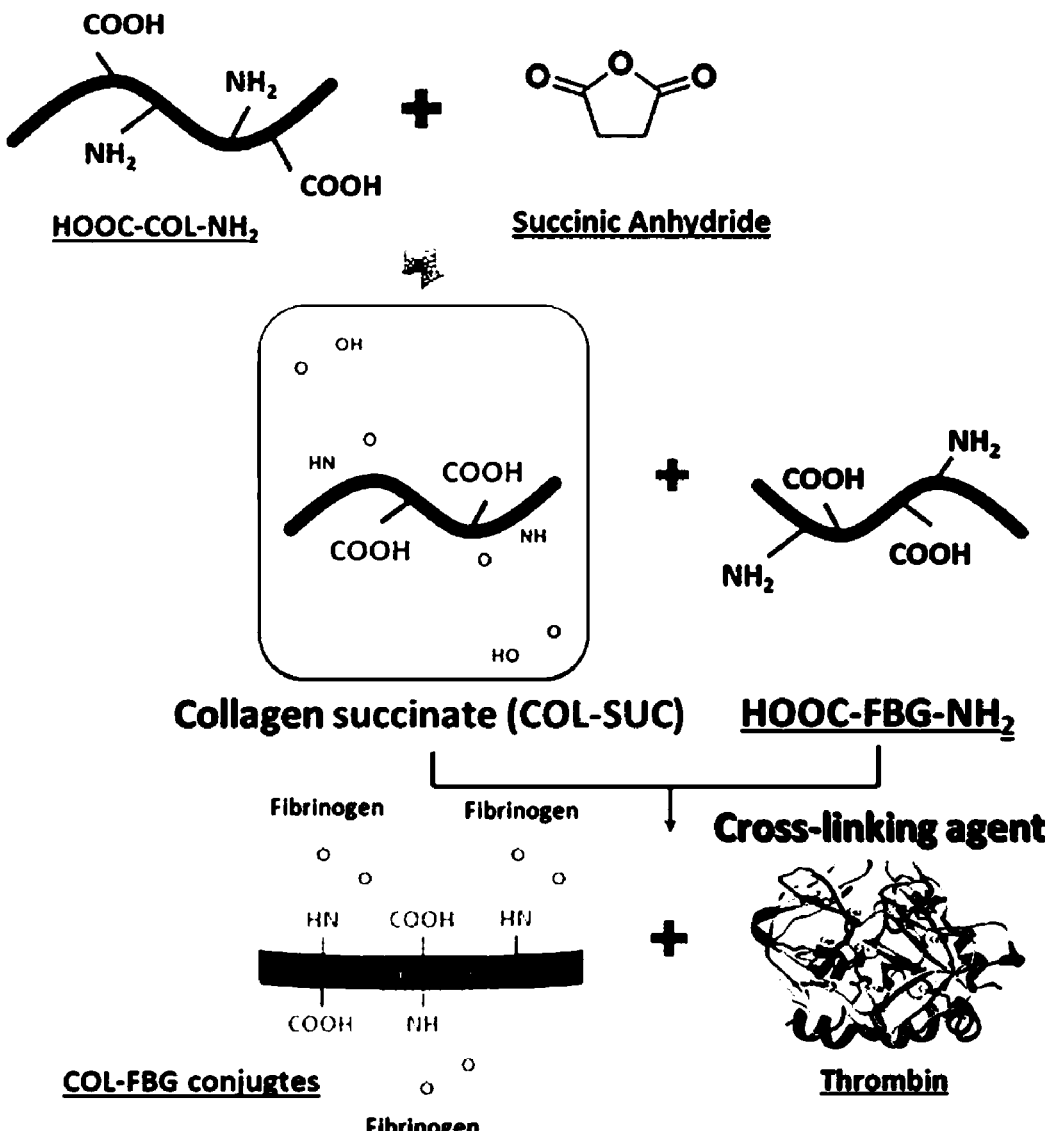

[Figure 2]
Transparent
2% COL-SUC was dissolved in DW.
Opaque
2% Atelocollagen was dissolved in DW.

[Figure 3]
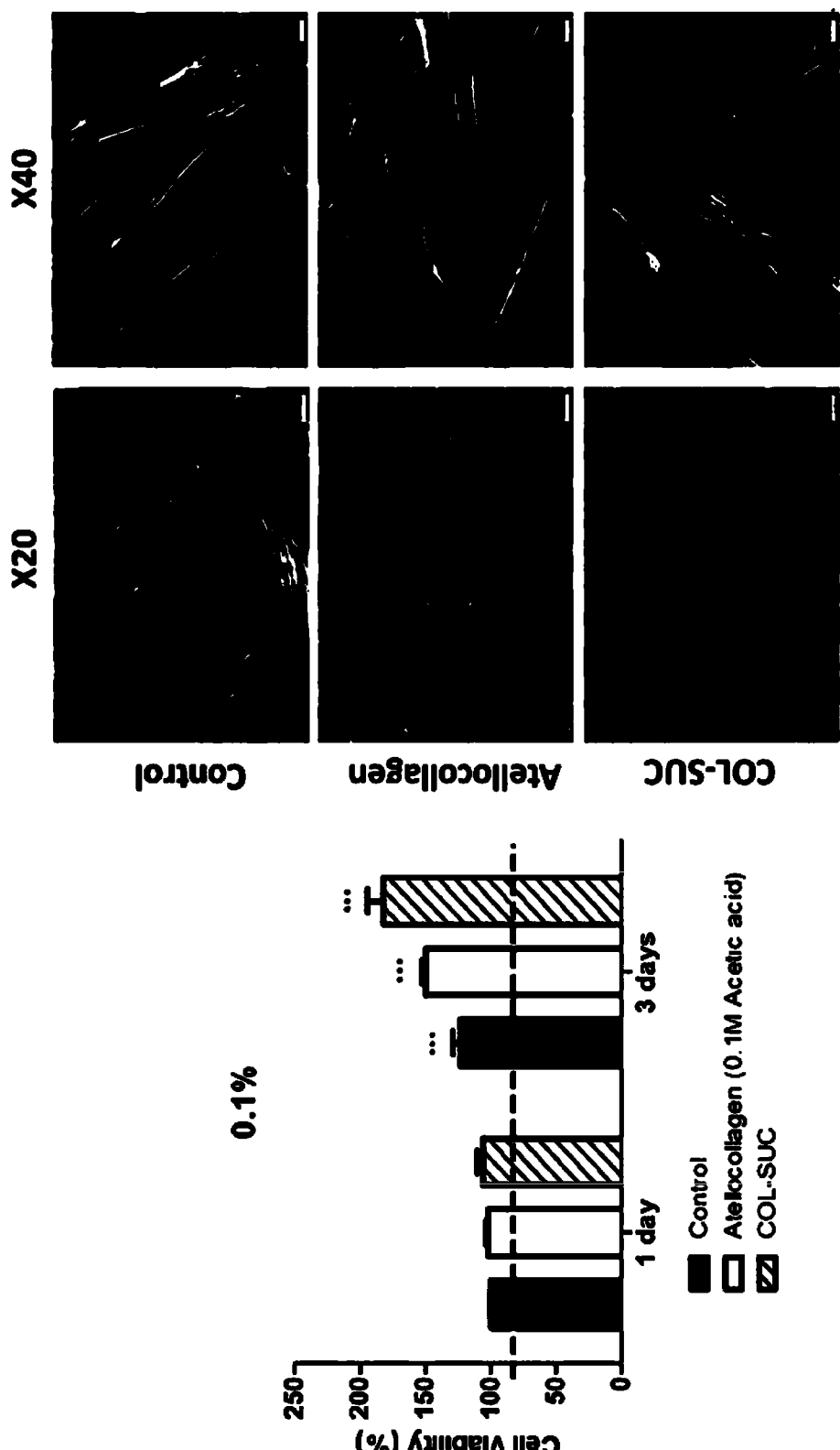

[Figure 4]
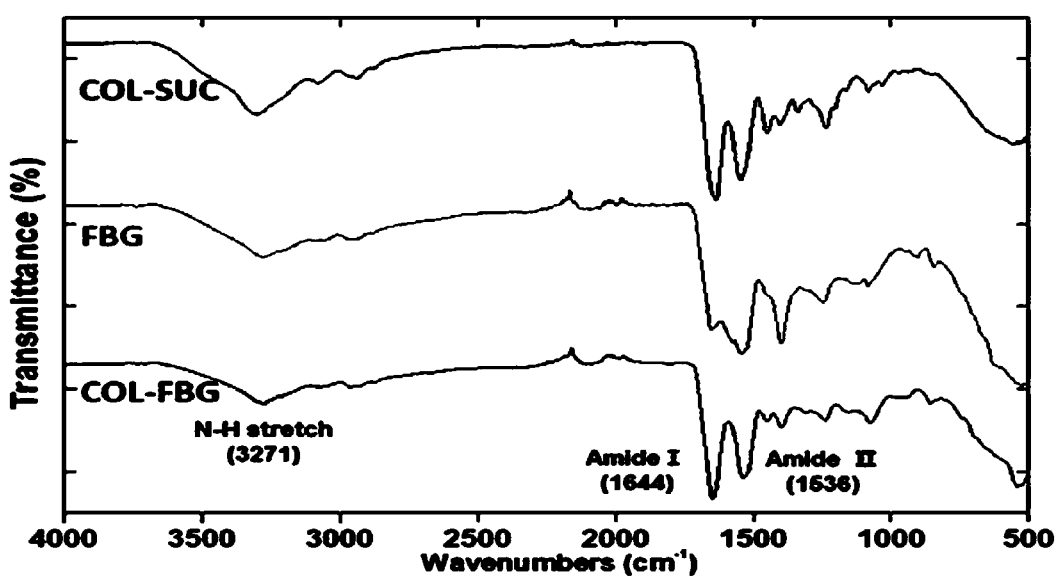

[Figure 5]
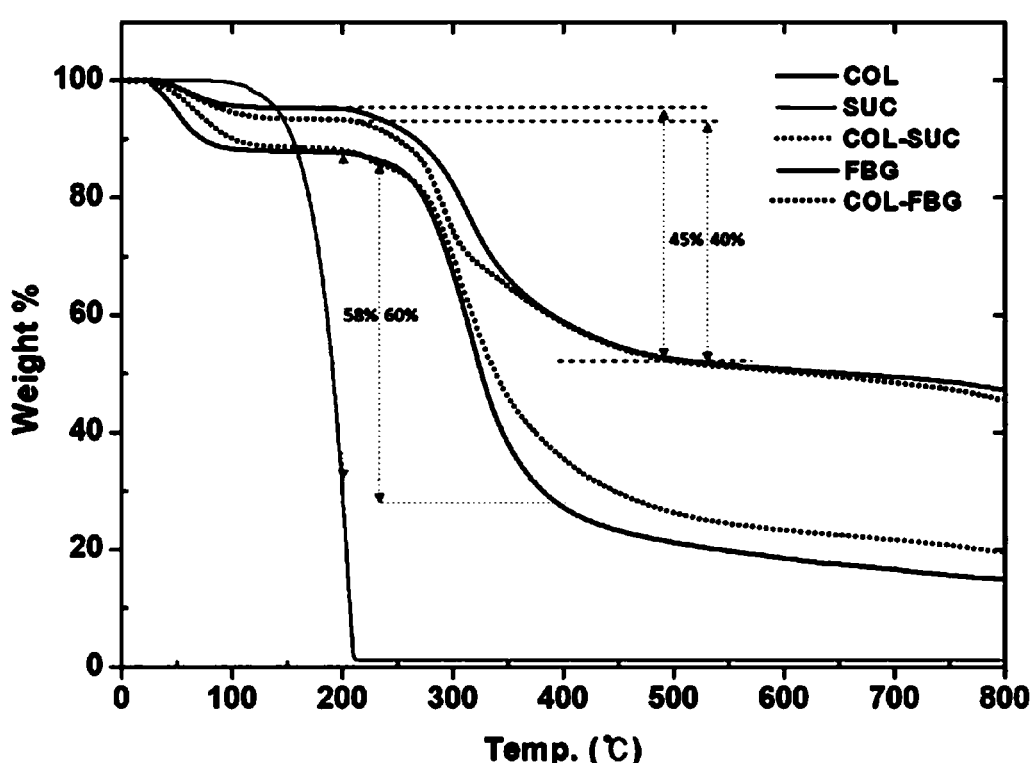

[Figure 6]
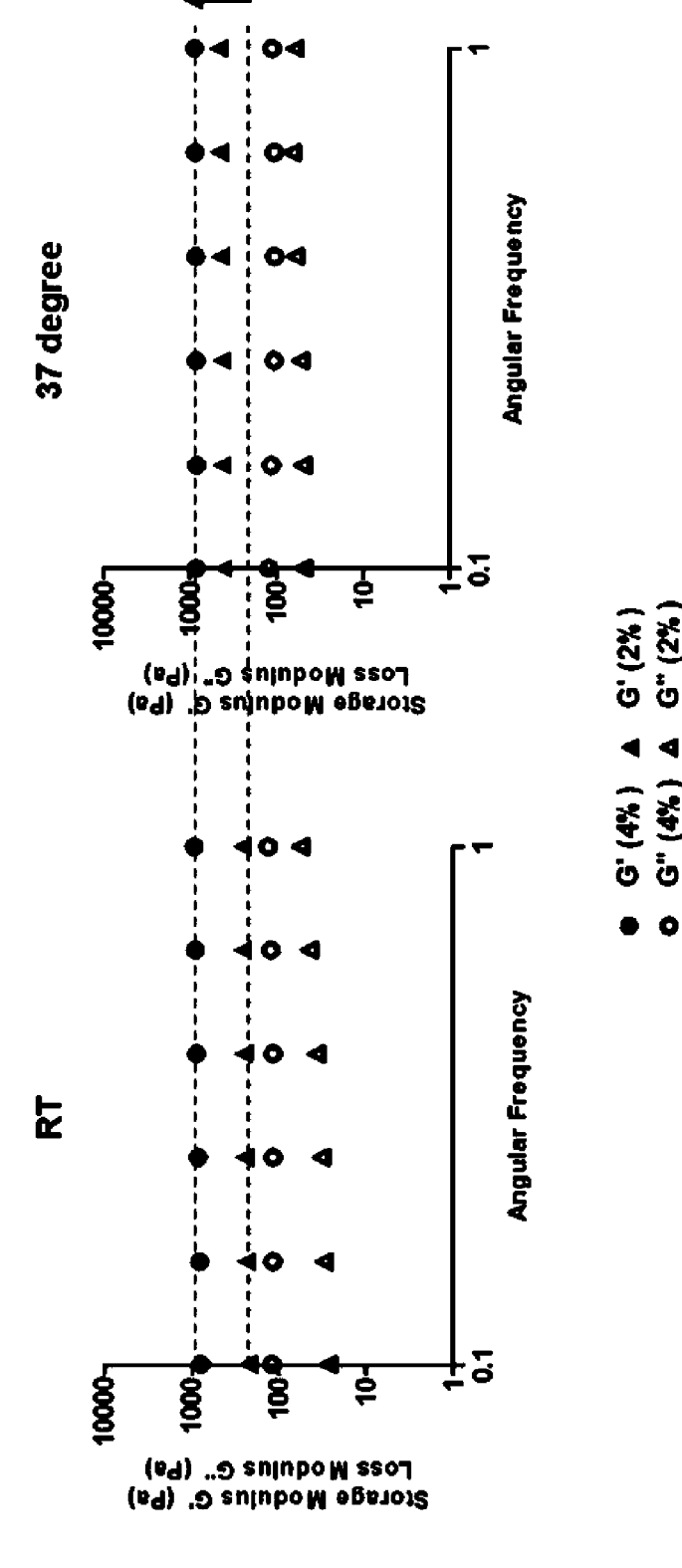

[Figure 7]
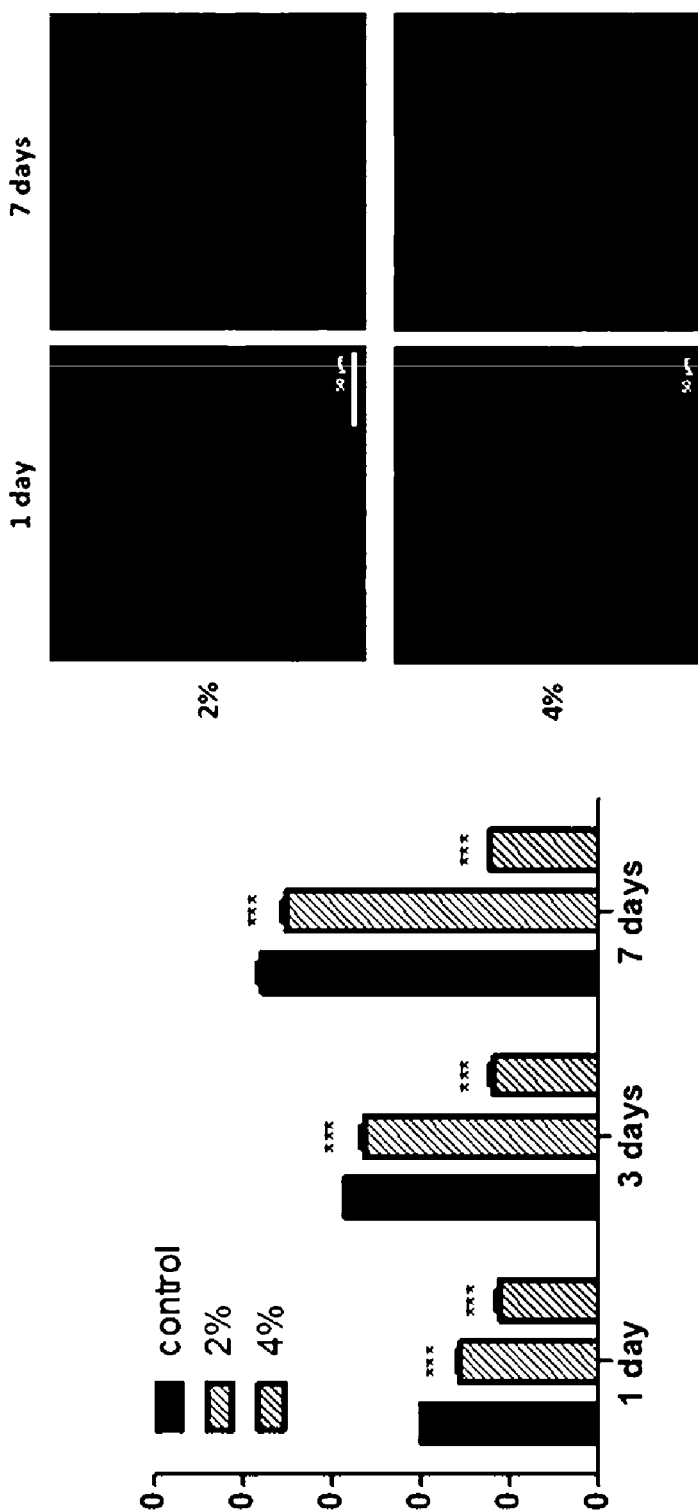

[Figure 8]
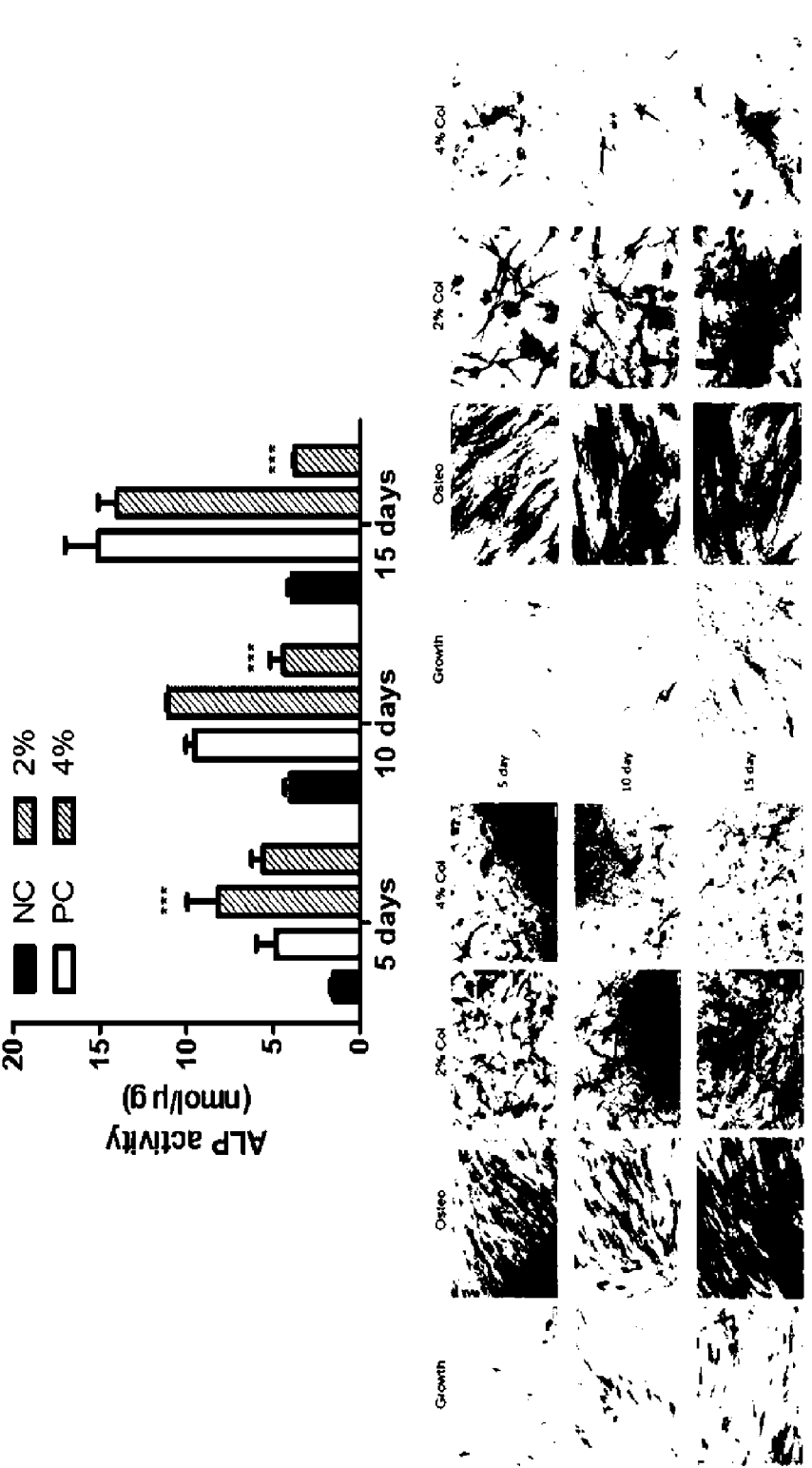

[Figure 9]
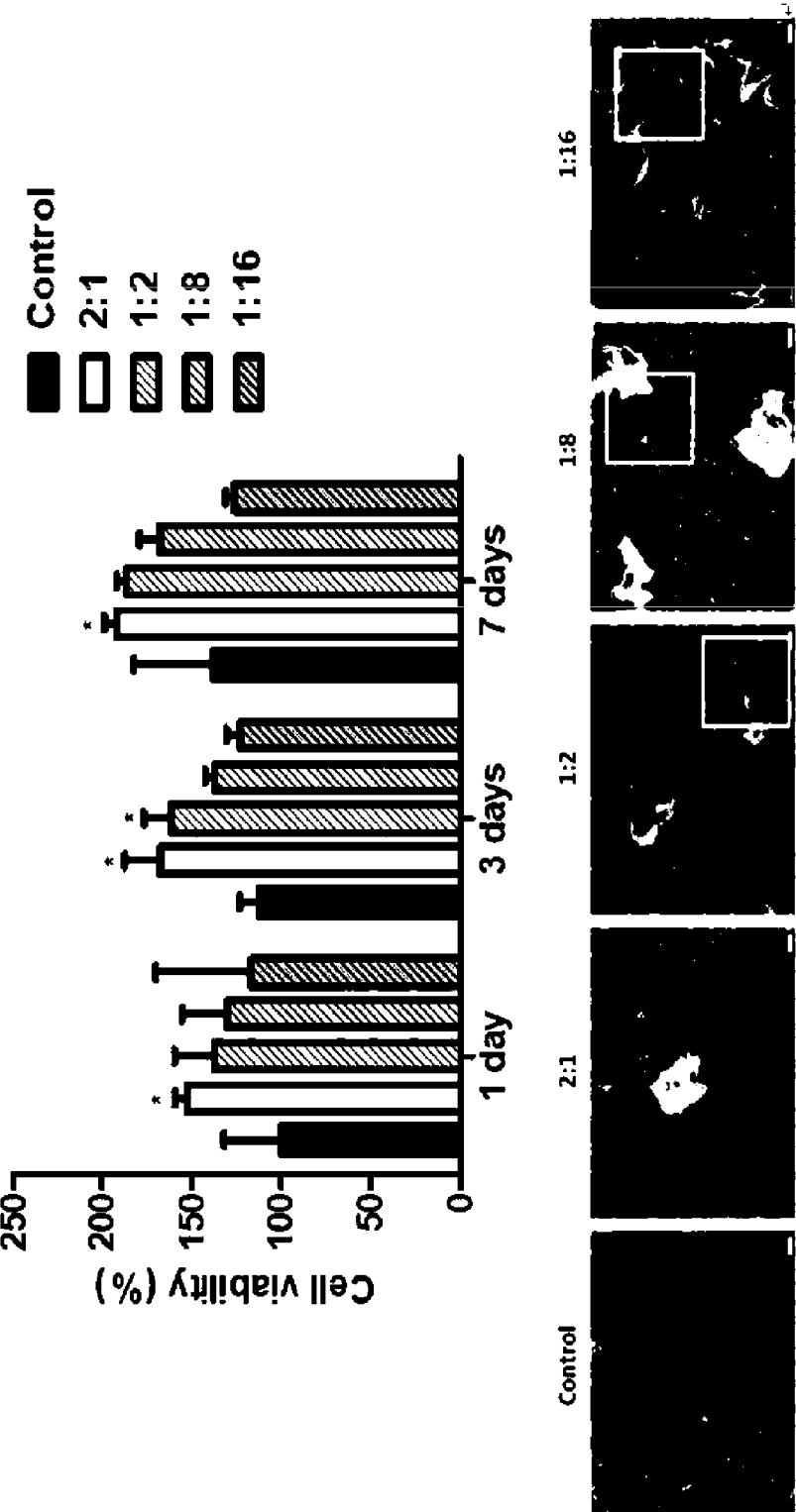

[Figure 10]
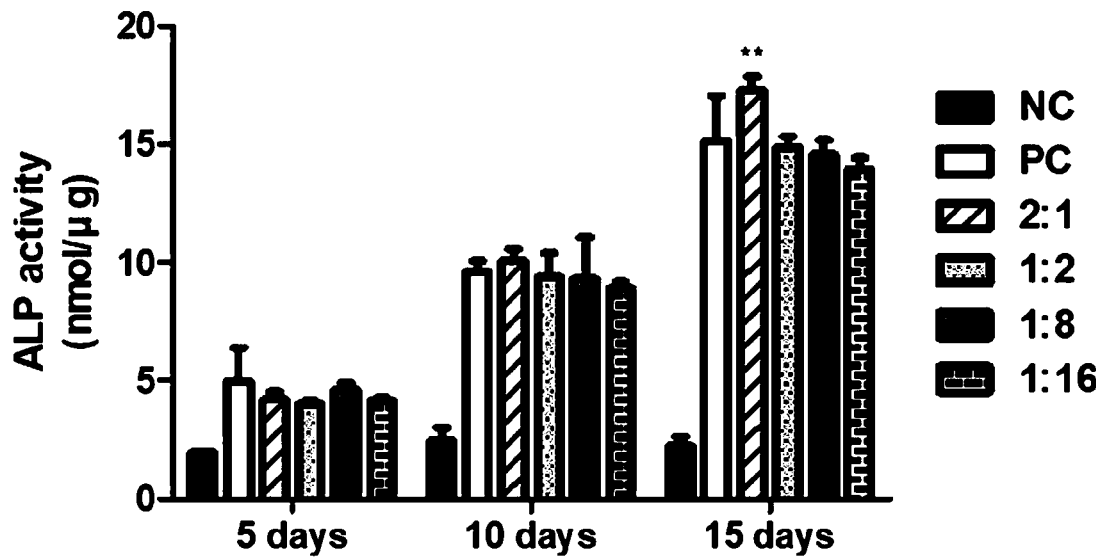

METHOD FOR PREPARATION OF SUCCINYLATED COLLAGEN-FIBRINOGEN HYDROGEL

RELATED APPLICATIONS

The present invention is a U.S. National Stage under 35 USC 371 patent application, claiming priority to Serial No. PCT/KR2020/011037, filed on Aug. 19, 2020; which claims priority from Korean Patent Application No. 10-2019-0138136 filed on Oct. 31, 2019; the entireties of both are hereby incorporated herein by reference.

TECHNICAL FIELD

The present invention relates to a method of preparing a succinylated collagen-fibrinogen hydrogel and a succinylated collagen-fibrinogen hydrogel prepared thereby.

BACKGROUND ART

Collagen is a scleroprotein that is mostly present in the bone and skin of an animal, and also distributed in cartilage, organ membranes, and hair, and is also a component of fish scales. It is also present as a fibrous solid. It has a complicated structure with cross-striations as seen under an electron microscope, and is insoluble in water, a dilute acid, and a dilute alkali, but dissolves into gelatin when boiled. It is a protein that has a structure in which 3 polypeptide chains are coiled into a triple helix and particularly has a high content of hydroproline. An amino acid sequence of collagen includes amino acids which are mainly composed of 'glycine-proline-X' or 'glycine-amino acid-hydroxyproline,' wherein the amino acid is glycine, hydroxyproline, proline, and the like. Also, collagen is not degraded by proteases such as trypsin, but is degraded by collagenases.

A method of isolating collagen from a tissue involves extraction with an organic solvent, acid/alkaline treatment, and an action of trypsin/hyaluronidase. As an insoluble substance, collagen is obtained through this procedure.

Collagen is a representative biodegradable polymer substance, and has been widely used as a scaffold in the field of tissue engineering. Although collagen is insoluble, it has advantages of excellent stability as a biomaterial and difficulty in generating an immune response due to high homology between animals.

For this reason, collagen has been actively used in the field of food, pharmaceuticals, and cosmetics.

However, collagen does not dissolve well at pH 5 or higher, and thus precipitates and aggregates.

In the related art, collagen was mostly solubilized under a weak acid condition, but when the collagen solubilized by dissolution under an acidic condition is used as is to prepare a hydrogel, which is then used as a biomaterial, there may be an adverse effect on cells.

In this regard, Korean Patent No. 10-0465015 discloses a method of preparing type I collagen with high purity by removing non-collagenous substances through enzymatic treatment, reducing immunity, and extracting and removing aliphatic impurities and insoluble collagen using an organic solvent. However, when the organic solvent is used as described above, collagen may be denatured, and the use of an organic solvent harmful to the human body has a problem in that it causes side effects during biological application when the separated collagen is used to prepare a hydrogel.

DISCLOSURE

Technical Problem

Therefore, the present invention is directed to providing a method of preparing a succinylated collagen-fibrinogen hydrogel by binding succinic acid to collagen through a simple process to prepare succinylated collagen having improved hydrophilicity and biocompatibility, which may be then used as a biomaterial.

The present invention is also directed to providing a succinylated collagen-fibrinogen hydrogel prepared by the method.

Technical Solution

To achieve the objects of the present invention as described above, according to an aspect of the present invention, there is provided a method of preparing a collagen-fibrinogen hydrogel, which includes dissolving collagen in a weak acid and adding 4-dimethylaminopyridine (DMAP) thereto while stirring; adding succinic anhydride to the stirred product at room temperature to mix the succinic anhydride and the stirred product; adding NaOH to the mixture to adjust the pH of the mixture to pH 7 to 8 and react the mixture while stirring; dialyzing the reaction product and freeze-drying the dialyzed solution to prepare succinylated collagen; dissolving the succinylated collagen in deionized water; adding N-hydroxysuccinimide and 1-ethyl-3-(3-dimethyl aminopropyl) carbodiimide hydrochloride dissolved in deionized water to the succinylated collagen dissolved in deionized water while stirring; adding fibrinogen dissolved in phosphate buffered saline thereto while stirring; dialyzing the stirred product and freeze-drying the dialyzed solution to prepare a succinylated collagen-fibrinogen complex; dissolving the collagen-fibrinogen complex in phosphate buffered saline; mixing a thrombin solution and a calcium chloride solution dissolved in phosphate buffered saline with the dissolved solution; and applying heat to the resulting mixture to gel the mixture.

According to another aspect of the present invention, there is provided a succinylated collagen-fibrinogen hydrogel prepared by the method.

Advantageous Effects

A method of preparing a succinylated collagen-fibrinogen hydrogel according to the present technology can produce a collagen-based biomaterial in a simple process, wherein the agglomeration of collagen can be prevented and the collagen-based biomaterial can exhibit excellent in vivo biocompatibility because the collagen-based biomaterial is improved in all of hydrophilicity, cell growth rate, cell compatibility, and cell diffusion capability.

DESCRIPTION OF DRAWINGS

FIG. 1 is a schematic diagram showing a process of preparing a succinylated collagen-fibrinogen hydrogel, which includes preparing succinylated collagen according to the present technology and binding fibrinogen to the succinylated collagen.

FIG. 2 is an image for comparing the results obtained by dissolving atelocollagen and succinylated collagen (COL-SUC) according to the present technology in deionized water at a concentration of 2%, respectively.

FIG. 3 shows the results of performing a collagen plate-coating test in order to evaluate the cell proliferation capability (biocompatibility) of COL-SUC prepared according to the present technology.

FIG. 4 shows the results of measuring the chemical state of surfaces of COL-SUC and COL-FBG according to the present technology using a Fourier transform infrared spectrometer (FT-IR, Thermo Scientific Nicolet 380 spectrometer, USA).

FIG. 5 shows the results of thermogravimetric analysis (TGA) of COL-SUC and COL-FBG according to the present technology.

FIG. 6 shows the rheometer experiment results of a COL-FBG hydrogel according to the present technology.

FIG. 7 shows the results of evaluating the biocompatibility of the COL-FBG hydrogel according to the present technology.

FIG. 8 shows the results of evaluating the alkaline phosphatase (ALP) activity of the COL-FBG hydrogel according to the present technology.

FIG. 9 shows the results of evaluating the in vivo biocompatibility of the COL-FBG hydrogel according to the present technology.

FIG. 10 shows the results of measuring ALP activity at a mixing ratio of COL-FBG and a bone graft tested using the 2% COL-FBG hydrogel.

BEST MODE

According to one aspect of the present technology, there is provided a method of preparing a succinylated collagen-fibrinogen hydrogel, which includes: (a) dissolving collagen in a weak acid and adding 4-dimethylaminopyridine (DMAP) thereto while stirring; (b) adding succinic anhydride to the stirred product at room temperature to mix the succinic anhydride and the stirred product; (c) adding NaOH to the mixture to adjust the pH of the mixture to pH 7 to 8 and react the mixture while stirring; (d) dialyzing the reaction product and freeze-drying the dialyzed solution to prepare succinylated collagen; (e) dissolving the succinylated collagen in deionized water; (f) adding N-hydroxysuccinimide and 1-ethyl-3-(3-dimethyl aminopropyl) carbodiimide hydrochloride dissolved in deionized water to the succinylated collagen dissolved in deionized water while stirring; (g) adding fibrinogen dissolved in phosphate buffered saline thereto while stirring; (h) dialyzing the stirred product and freeze-drying the dialyzed solution to prepare a succinylated collagen-fibrinogen complex; (i) dissolving the collagen-fibrinogen complex in phosphate buffered saline; (j) mixing a thrombin solution and a calcium chloride solution dissolved in phosphate buffered saline with the dissolved solution of Step (i); and (k) applying heat to the resulting mixture to gel the mixture.

The weak acid of Step (a) may be an acid with pH 3 to 6, preferably acetic acid.

In Step (b), the succinic anhydride is preferably added at 20 to 50 parts by weight, more preferably 25 to 45 parts by weight, further preferably 30 to 40 parts by weight, based on 100 parts by weight of the collagen in consideration of the adequacy of the reaction.

The dialysis of Step (d) is preferably performed using a dialysis tube with a molecular weight cut-off of 3,000 to 3,500 Da in consideration of the size of the succinic acid collagen to be prepared.

The collagen-fibrinogen complex is preferably dissolved in phosphate buffered saline in Step (i) so that a concentration of the collagen-fibrinogen complex becomes a concentration of 1 to 5%.

According to another aspect of the present technology, there is provided a succinylated collagen-fibrinogen hydrogel prepared by the method. The hydrogel prepared according to the present technology has excellent cell evolutionary potential and thermal stability, and exhibits excellent cell proliferation and osteogenic differentiation performance upon in vivo implantation.

Hereinafter, the configurations and actions of examples of the present technology will be described in detail with reference to the drawings.

Example 1: Materials

Type I atelocollagen from Dalim Tissen Co., Ltd. (Korea) was used as collagen. Succinic anhydride (SA; >99%), 4-dimethylaminopyridine (DMAP; >98%), human plasma protein (50% to 70%)—derived fibrinogen, human plasma-derived thrombin, 1-ethyl-3-(3-dimethyl aminopropyl) carbodiimide hydrochloride (EDC) and N-hydroxysuccinimide (NHS) were purchased from Sigma Aldrich Co., Ltd. (USA) and used. Deionized water (DW) was prepared using an ultrapure water system (Puris-Ro800, Bio Lab Tech., Korea). Acetic acid was purchased from Junsei Chemical Co., Ltd. (Japan). Dulbecco's phosphate-buffered saline (DPBS; pH 7.4) was purchased from Gibco (USA). Human adipose tissue-derived MSCs (CEFOgro™ ADMSCs), a human adipose tissue-derived MSC growth medium, and supplements (10% FBS, 0.02% penicillin and streptomycin) were purchased from CEFO Co., Ltd. 48-well cell culture plates and cell culture dishes (100 mm×20 mm) were purchased from Corning Inc. (USA). EZ-Cytox (an enhanced cell viability assay kit) was purchased from Dogen (Korea). All reagents and solvents were used as received without further purification.

Example 2: Preparation of Succinylated Collagen (COL-SUC)

FIG. 1 is a schematic diagram showing a process of preparing a succinylated collagen-fibrinogen hydrogel, which includes preparing succinylated collagen according to the present technology and binding fibrinogen to the succinylated collagen.

The succinylated collagen (COL-SUC) according to the present technology was synthesized through a ring-opening polymerization reaction under acidic conditions.

Atelocollagen (500 mg, one equivalent) was dissolved in 0.1 M acetic acid at a concentration of 0.3%, and stirred overnight. Thereafter, a reaction was performed by vigorously stirring the resulting mixture for an hour using a magnetic bar while adding 4-dimethylaminopyridine (DMAP, 583.7 mg, 5.8 mmol) as a catalyst.

When the reaction was completed, succinic anhydride (SA; 145.9 mg, 1.45 mmol) was added in three portions to the solution at room temperature for an hour. Then, the mixture was adjusted to pH 7 to 8 using 1 N NaOH while stirring at room temperature. In this case, the reaction mixture was a clear solution. The solution whose pH was adjusted was reacted overnight, and the reaction mixture was then dialyzed against deionized water (DW) for 3 days using a 3,500 Da dialysis tube. The dialyzed solution was freeze-dried and stored at −70° C.

FIG. 2 is an image for comparing the results obtained by dissolving atelocollagen and succinylated collagen (COL-SUC) according to the present technology in deionized water at a concentration of 2%, respectively. As shown in FIG. 2, it was shown that the atelocollagen (left) was not easily dissolved, but it can be seen with the naked eye that the succinylated collagen (COL-SUC) (right) according to the present technology was easily dissolved.

Example 3: Evaluation of COL-SUC Cell Proliferation

To evaluate the cell proliferation capability (biocompatibility) of the COL-SUC of Example 2 prepared according to the present technology, a collagen plate coating test was performed.

0.1% atelocollagen (Comparative Example) and COL-SUC (Example) were dissolved in 0.1 M acetic acid, and 0.1% COL-SUC was separately dissolved in deionized water.

For collagen coating, a 96-well plate was immersed in 100 μL of a collagen solution at room temperature for 2 hours. Then, the 96-well plate was taken from the collagen solution, washed three timed with PBS, and air-dried under a hood. A 96-well plate which was not coated with atelocollagen or COL-SUC was used as the control. Human adipose tissue-derived MSC cells (hADSCs) were seeded in 96-well tissue culture plates of each of the control, Comparative Example and Examples prepared as described above at a density of $2\times10^4$ cells per well. The hADSCs were grown in a human adipose tissue-derived MSC growth medium with supplements (10% FBS, 0.02% penicillin and streptomycin). In all the experiments, the hydrogel was washed with sterile PBS, and the culture medium was replaced with a fresh medium every 2 days. Each of the plates was incubated at 37° C. for different periods of 1, 3 and 7 days under a 5% $CO_2$ atmosphere, and 100 μL of a cell counting kit (CCK) solution was then added to each well of the 96-well tissue culture plate, and incubated for 2 hours.

The absorbance of the 96-well tissue culture plate in which the human adipose tissue-derived MSC cells (hADSCs) were cultured was measured at 450 nm using a Benchmark Plus microplate spectrophotometer (Bio-Rad, BR170-6930). The results are shown in FIG. 3.

As shown in FIG. 3, it can be seen that the activity of the cells cultured in the plate coated with COL-SUC (Example) according to the present technology was shown to be high, compared to that of the plate coated with atelocollagen (Comparative Example). A more notable difference in activity was shown as the culture time increased. From the image seen under the microscope, it can be seen that the cell proliferation was more active in COL-SUC (Example), compared to the group (control group) in which the plate was not coated with anything and the group (Comparative Example) in which the plate was coated with atelocollagen.

Example 4: Preparation of Fibrinogen-Conjugated Succinylated Collagen Complex (COL-FBG)

A fibrinogen-conjugated succinylated collagen complex (COL-FBG) according to the present technology was prepared.

The COL-SUC (30 mg, 1 equivalent) prepared in Example 2 was dissolved in 15 mL of deionized water for 2 hours, and fibrinogen (FBG, 680 mg, 20 equivalents) was separately dissolved in 20 mL of phosphate buffered saline (PBS, pH 7.4) for 10 minutes. Also, separately from the above solutions, 1-ethyl-3-(3-dimethyl aminopropyl) carbodiimide hydrochloride (EDC, 0.0776 mg, 5 equivalents) and N-hydroxysuccinimide (NHS, 0.1151 mg, 10 equivalents) were dissolved in 1 mL of deionized water. EDC and NHS were added to the COL-SUC solution while vigorously stirring for 15 minutes using a magnetic bar. Then, the FBG solution was slowly added thereto, and the reaction mixture was then stirred for an hour. When the stirring was completed, a translucent solution was obtained. The resulting solution was dialyzed against PBS for 3 days using a 14 kDa dialysis tube. The dialyzed solution was a clear solution, which was then freeze-dried and stored at −70° C.

Example 5: Evaluation of Characteristics of COL-SUC and COL-FBG 5-1. Infrared Spectrometric Measurement The infrared spectroscopic characteristics of the COL-SUC prepared in Example 2 and the COL-FBG prepared in Example 4 were evaluated. FIG. 4 shows the results of measuring the chemical state of surfaces of the COL-SUC and COL-FBG according to the present technology using a Fourier transform infrared spectrometer (FT-IR, Thermo Scientific Nicolet 380 spectrometer, USA). A process of synthesizing fibrinogen on COL-SUC was performed by bringing an amine group of fibrinogen into contact with a carboxyl group of COL-SUC to form an amide group. As shown in FIG. 4, it can be seen that the synthesis was successfully carried out through the peaks of amide I (1,644 $cm^{-1}$) and amide II (1,536 $cm^{-1}$).

5-2. Thermogravimetric Analysis

Thermogravimetric analyses (TGA) of the COL-SUC prepared in Example 2 and the COL-FBG prepared in Example 4 were performed.

FIG. 5 shows the results of thermogravimetric analysis (TGA) of the COL-SUC and COL-FBG according to the present technology. TGA was performed using TA Instruments 2960 SDT V3.0F.

TGA was performed to check the synthesis and thermal stability of the complex, and a binding amount of fibrinogen.

Various samples including the COL-SUC prepared in Example 2 and the COL-FBG prepared in Example 4 were put into a platinum pan in a furnace at an amount of 2 mg to 6 mg. The samples were heated from 10° C. to 800° C. at a heating rate of 10° C./min under nitrogen flow conditions.

As shown in FIG. 5, it can be seen that the thermal stability increased by approximately 25° C. in the case of the COL-SUC according to the present technology, compared to pure collagen (COL). Also, it can be seen that the thermal stability increased by approximately 10° C. in the case of the COL-SUC according to the present technology, compared to pure fibrinogen (FBG). Also, a binding amount of FBG in the COL-FBG was calculated. As a result, it can be seen that 88.8% of FBG in the COL-FBG was bound (at a percentage of 40% in COL-FBG relative to 45% of FBG).

Example 6: Preparation of COL-FBG Hydrogel

The COL-FBG prepared in Example 4 was used to prepare a COL-FBG hydrogel. The COL-FBG was dissolved in PBS so that the COL-FBG was prepared at concentrations of 2% and 4%, respectively.

Separately, to prepare a cross-linking agent, first, thrombin (TRB) was dissolved in PBS at a concentration of 1,000 IU/mL while stirring at room temperature for 2 minutes. Also, a calcium chloride solution was prepared at a concentration of 50 mM. Thereafter, the thrombin solution and the calcium chloride solution were added at a ratio of 1:1 to prepare a cross-linking agent. The cross-linking agent solution was added to the previously prepared COL-FBG solution, and mixed at a volume ratio of 98:2 (COL-FBG solution:cross-linking agent solution). Then, the mixture was stirred until the mixture became homogeneous. Until a separate gel was formed, the mixture was heated to a temperature of 37° C. in an incubator to induce COL-FBG gelation. In order to polymerize fibrinogen into fibrin, the mixture was incubated in 10 IU/mL of the thrombin solution to prepare a COL-FBG hydrogel.

Example 7: Evaluation of Characteristics of COL-FBG Hydrogel 7-1. Rheometer Experiment A rheometer experiment was performed on the COL-FBG hydrogel of the present technology prepared in Example 6. FIG. 6 shows the rheometer experiment results of the COL-FBG hydrogel according to the present technology.

A rheometer experiment was performed at room temperature (25° C.) and 37° C. using a rotating rheometer with parallel plates in a vibration mode (Anton Paar, Austria). The frequency-dependent viscoelastic behavior of the COL-FBG hydrogel prepared in the form of a disc was measured using a rotating rheometer with a plate-plate geometry having a diameter of 8 mm and a gap of 1 mm. The storage modulus (G') and loss modulus (G") values of each sample were calculated using the following Equation 1, and a frequency sweep was performed at a constant strain of 1% over the range of 0.1 to 10 Hz.

$$G' = \frac{\sigma_0}{\varepsilon_0}\cos\delta,\ G'' = \frac{\sigma_0}{\varepsilon_0}\sin\delta \qquad \text{[Equation 1]}$$

As shown in FIG. 6, it can be seen that both COL-FBG hydrogels had higher fluidity at 37° C. when COL-FBG was added at concentrations of 2% and 4%. This is because collagen naturally gels at 37° C. and fibrinogen is converted to fibrin from the starting point of 37° C., resulting in sol-gel conversion. It was shown that the commercially available collagen gel or fibrin gel had a strength of approximately 850 Pa, whereas the COL-FBG hydrogel of Example 6 had a strength of approximately 400 Pa and approximately 850 Pa when COL-FBG was added at concentrations of 2% and 4%, respectively. Therefore, it can be seen that the COL-FB G hydrogel of Example 6 of the present technology has strength and fluidity more suitable for in vivo use.

7-2. Evaluation of Biocompatibility

An evaluation test was performed for the biocompatibility of the COL-FBG hydrogel of the present technology prepared in Example 6. Cells for biocompatibility evaluation were obtained by encapsulating human adipose tissue-derived MSC cells (hADSCs) in a 96-well tissue culture plate at a density of $2\times10^4$ cells per well. The hADSCs were grown in a human adipose tissue-derived MSC growth medium with supplements (10% FBS, 0.02% penicillin and streptomycin). In all the experiments, the hydrogel was washed with sterile PBS, and the culture medium was replaced with a fresh medium every 2 days. Each of the plates was incubated at 37° C. for different periods of 1, 3 and 7 days under a 5% $CO_2$ atmosphere, and 100 µL of a CCK solution was then added to each well of the 96-well tissue culture plate, and the plate was incubated for 2 hours.

Absorbance was measured using a Benchmark Plus microplate spectrophotometer (Bio-Rad, BR170-6930). The results are shown in FIG. 7.

As shown in FIG. 7, the cytotoxicity of the hydrogel at COL-FBG concentrations of 2% and 4% was evaluated, and the hydrogel was stained with F-actin to determine the cell growth rate using a fluorescence microscope. From the cytotoxicity evaluation and microscopic observation results, it was confirmed that the cell growth rate was better in the 2% hydrogel. It can be seen that the cells were not relatively well grown in the 4% hydrogel because the inner part of the 4% hydrogel was too compact. In general, the cells were hardly proliferated and extended in the hydrogel, but such cell growth was possible in the COL-FBG hydrogel of the present technology prepared in Example 6 because the COL-FBG hydrogel included cell-friendly collagen and fibrin. In FIG. 7, the cells cultured in a 2D manner in a plate were used as the control.

7-3. Evaluation of Alkaline Phosphatase (ALP) Activity

An alkaline phosphatase (ALP) activity evaluation test was performed on the COL-FBG hydrogel of the present technology prepared in Example 6. Human adipose tissue-derived MSC cells (hADSCs) were encapsulated in a 48-well tissue culture plate at a density of $2\times10^4$ cells per well, and cultured in a growth medium for a day, and the medium was replaced with an osteogenic medium. The cell cultures were collected on days 5, 10, and 15, and used as samples.

For the analysis of ALP activity, the cultured hADSCs were washed with DPBS, and dissolved in a 3×RIPA buffer at 4° C. for an hour. The dissolved hADSCs were centrifuged at 10,000 rpm for 10 minutes, and the supernatant was reacted with p-nitrophenolphosphate (pNPP; Sigma Aldrich Co., Ltd.) for 30 minutes in a 37° C. incubator. A production amount of p-nitrophenol was measured at a wavelength of 405 nm using an ELISA reader. The results are shown in FIG. 8.

As shown in FIG. 8, the COL-FBG hydrogel was stained to confirm alkaline phosphatase activity. It can be seen that the osteogenic differentiation proceeded well in the 2% hydrogel when compared to the 4% hydrogel having a more compact inner part. In FIG. 8, NC represents the cells cultured in a 2D manner in a plate using a growth medium, and PC represents the cells cultured in a 2D manner in a plate using an osteogenic differentiation medium.

7-4. Evaluation of In Vivo Biocompatibility

An in vivo biocompatibility evaluation test was performed on the COL-FBG hydrogel of the present technology prepared in Example 6. For the test, freeze-dried 2% COL-FBG was dissolved in PBS at room temperature. The solution in which COL-FBG was dissolved was used to prepare bone grafts at a COL-FBG:bone graft ratio of 2:1, 1:2, 1:8, and 1:16, respectively.

The same percentage of the thrombin solution was added to the mixed solution, and the resulting solution was poured between two glass slides having a gap of 1 mm After the mixing, the mixture was cross-linked under the same conditions as the COL-FBG hydrogel in Example 6.

The cross-linked complex was cut into pieces with a diameter of 6 mm for further experiments. Cell culture and absorbance measurement were performed in the same manner as in the biocompatibility evaluation test of Example 7-2 after the hydrogel was prepared. This experiment was performed on the hydrogel prepared at a COL-FBG concentration of 2%. Then, a cytotoxicity evaluation was performed, and the hydrogel was stained with F-actin to determine the cell growth rate using a fluorescence microscope. The results are shown in FIG. 9.

As shown in FIG. 9, it can be seen that the cell survival rate was highest in the group (2:1) in which the COL-FBG was added at a higher percentage and the bone graft was added at the lowest percentage in the hydrogel when compared to the 2% hydrogel used as the control, and that the cell survival rate decreased as the bone graft was included at an increasing percentage (1:16). From these results, it can be seen that the COL-FBG of the hydrogel prepared with an increasing percentage of the COL-FBG acted more friendly on the surrounding environment, resulting in an increased survival rate of the cells. In FIG. 9, the cells cultured in a 2D manner in a plate were used as the control.

FIG. 10 shows the results of measuring ALP activity at a mixing ratio of the COL-FBG and the bone graft tested using the 2% COL-FBG hydrogel. As shown in FIG. 10, it can be seen that the osteogenic differentiation proceeded well as the bone graft was included at a smaller percentage. In FIG. 10, NC represents the cells cultured in a 2D manner in a plate using a growth medium, and PC represents the cells cultured in a 2D manner in a plate using an osteogenic differentiation medium.

While the present technology has been shown and described with reference to certain exemplary embodiments thereof, it will be understood that the exemplary embodiments are not intended to limit the scope of the present technology. Thus, it will be apparent to those skilled in the art that various changes and modifications may be made to the exemplary embodiments without departing from the spirit and scope of the present technology, and the present technology encompasses such changes and modifications.

INDUSTRIAL APPLICABILITY

According to the present technology, a hydrogel excellent in all of hydrophilicity, cell growth rate, cell compatibility, and cell diffusion capability may be prepared, and thus may be used to develop various biocompatible substances such as bone fillers, drug delivery systems, and the like.

The invention claimed is:

1. A method of preparing a succinylated collagen-fibrinogen hydrogel, comprising:
   (a) dissolving collagen in a weak acid and adding 4-dimethylaminopyridine (DMAP) thereto while stirring;

(b) adding succinic anhydride to the stirred product at room temperature to mix the succinic anhydride and the stirred product;
   (c) adding NaOH to the mixture to adjust the pH of the mixture to pH 7 to 8 and react the mixture while stirring;
   (d) dialyzing the reaction product and freeze-drying the dialyzed solution to prepare succinylated collagen;
   (e) dissolving the succinylated collagen in deionized water;
   (f) adding N-hydroxysuccinimide and 1-ethyl-3-(3-dimethyl aminopropyl) carbodiimide hydrochloride dissolved in deionized water to the succinylated collagen dissolved in deionized water while stirring;
   (g) adding fibrinogen dissolved in phosphate buffered saline thereto while stirring;
   (h) dialyzing the stirred product of step (g) to produce a dialyzed solution of succinylated collagen conjugated to fibrinogen and freeze-drying the dialyzed solution of succinylated collagen conjugated to fibrinogen to prepare a succinylated collagen-fibrinogen complex;
   (i) dissolving the collagen-fibrinogen complex in phosphate buffered saline;
   (j) mixing a thrombin solution and a calcium chloride solution dissolved in phosphate buffered saline with the dissolved solution of step (i); and
   (k) applying heat to the resulting mixture to gel the mixture.

2. The method of claim 1, wherein the weak acid of step (a) is acetic acid.

3. The method of claim 1, wherein 20 to 50 parts by weight of the succinic anhydride is added at step (b) based on 100 parts by weight of the collagen.

4. The method of claim 1, wherein the dialysis of step (d) is performed using a dialysis tube with a molecular weight cut-off of 3,000 to 3,500 Da.

5. The method of claim 1, wherein the dialysis of step (h) is performed using a dialysis tube with a molecular weight cut-off of 10 to 20 kDa.

6. The method of claim 1, wherein the collagen-fibrinogen complex is dissolved in phosphate buffered saline in step (i) so that a concentration of the collagen-fibrinogen complex becomes a concentration of 1 to 5%.

7. A succinylated collagen-fibrinogen hydrogel prepared by the method of claim 1.

* * * * *